(12) United States Patent
Mori et al.

(10) Patent No.: US 6,715,935 B2
(45) Date of Patent: Apr. 6, 2004

(54) OPTICAL MODULE AND METHOD OF MOUNTING AN OPTICAL ELEMENT IN THE OPTICAL MODULE

(75) Inventors: Hajime Mori, Tokyo (JP); Masayuki Iwase, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/358,446

(22) Filed: Feb. 3, 2003

(65) Prior Publication Data

US 2003/0142930 A1 Jul. 31, 2003

Related U.S. Application Data

(63) Continuation of application No. 09/746,733, filed on Dec. 22, 2000, now abandoned.

(30) Foreign Application Priority Data

Dec. 24, 1999 (JP) ............................................ 11-366668

(51) Int. Cl.[7] ................................................ G02B 6/42
(52) U.S. Cl. ............................ 385/88; 385/89; 385/90; 385/91; 385/92; 385/94
(58) Field of Search ..................................... 385/88–94

(56) References Cited

U.S. PATENT DOCUMENTS

| | | | |
|---|---|---|---|
| 5,412,748 A | | 5/1995 | Furuyama et al. |
| 5,966,488 A | * | 10/1999 | Miura et al. .................. 385/93 |
| 6,215,945 B1 | | 4/2001 | Fukuyama et al. |
| 6,270,263 B1 | | 8/2001 | Iwase et al. |
| 6,332,720 B1 | * | 12/2001 | Shimaoka et al. ............. 385/88 |

FOREIGN PATENT DOCUMENTS

JP   8-248269   9/1996

OTHER PUBLICATIONS

U.S. patent application entitled "Optical Module", having Application No. 09/125,957, naming Masayuki Iwase, et al, as inventors, and filed on Aug. 26, 1998.

* cited by examiner

*Primary Examiner*—John D. Lee
*Assistant Examiner*—Daniel Valencia
(74) *Attorney, Agent, or Firm*—Oblon, Spivak, McClelland, Maier & Neustadt, P.C.

(57) ABSTRACT

An optical module that is easy to manufacture and may arrange and position an optical element mounting substrate and a package with high precision is provided. A substrate side positioning groove portion is formed in an optical element mounting surface of the optical element mounting substrate on which an optical element is mounted, and a package side positioning groove portion is formed in the package on which the optical element mounting substrate is arranged. The optical element mounting substrate and the package are overlapped with each other with the substrate side positioning groove portion and the package side positioning groove portion facing each other. An optical fiber that is a positioning member is inserted between the positioning groove portions. Thus, the optical element mounting substrate and the package are positioned relative to each other. The respective positioning groove portions on the substrate side and on the package side may readily be formed with high precision. Also, the optical fiber may be manufactured with high precision. Thus, it is possible to position the optical element mounting substrate and the package with very high precision.

20 Claims, 7 Drawing Sheets

OPTICAL MODULE AND METHOD OF MOUNTING AN OPTICAL ELEMENT IN THE OPTICAL MODULE

RELATED APPLICATIONS

This application is a continuation of, and hereby claims priority to and incorporates by reference in its entirety, U.S. patent application Ser. No. 09/746,733 entitled "OPTICAL MODULE", which was filed on Dec. 22, 2000, now abandoned, and which claims priority to Japanese Application No. 11-366668, filed on Dec. 24, 1999.

BACKGROUND OF THE INVENTION

1. Field of the Invention

The present invention relates to an optical module used in optical communications or data communications.

2. Description of the Related Art

An optical module in which an optical element mounting substrate for mounting optical elements are arranged in a package has been used in optical communications or the like. Recently, in order to meet a requirement to save cost for the optical module, an optical module whose package is made of resin has heretofore been developed.

FIG. 7A is an exploded view of an optical module proposed in Japanese Patent Application No. Hei 9-007021 as an example of this type optical module. FIG. 7B is a perspective view of an example of an outer appearance of the optical module.

In the optical module 100 shown in FIGS. 7A and 7B, an array type optical element 1 in which, for example, light emitting portions or light receiving portions are arranged in an array is mounted on and fixed to an optical element mounting substrate 2. A pattern of electric signal wirings 10 is formed on a mounting surface (substrate surface) 28 of this optical element 1. Also, V-shaped grooves 9 (having a V-shape in cross section) as at least one pair of groove portions for positioning on the substrate side are formed on both sides with respect to the electric signal wirings 10.

There are various kinds of the optical elements 1. For example, there is a module in which a semiconductor laser chip having four channels for emitting an optical signal is arranged on a substrate, a module in which a photodiode chip for receiving an optical signal is arranged instead of the semiconductor laser chip, a module in which the semiconductor laser chip is arranged in the same manner and a photodiode chip for monitoring a light emission condition of the semiconductor laser chip is provided behind the semiconductor laser chip and the like. Among these optical elements, for example, the optical element that meets the specification is selected and mounted on and fixed to the optical element mounting substrate 2.

A package 4 is made of resin to have a base portion 31 and a side wall 32 having a substantially L-shape (an L-shape in cross section) that is in an upright position at an end face of the base portion 31. At least one (four in case of FIG. 7A) input/output optical fiber insertion hole 6 is formed in the side wall 32 of this package 4.

Input/output optical fibers 7 are inserted into the input/output optical fiber insertion holes 6, respectively. Each of the input/output optical fibers 7 is a short optical fiber for at least one of the optical input to the optical element 1 and the optical output of a beam outputted from the optical element 1 to the outside.

Further, a positioning projection 18 is formed in a position corresponding to each of the V-shaped grooves 9 of the optical element mounting substrate 2 in the package 4. As indicated by the arrow B in FIG. 7A, the substrate surface 28 of the optical element mounting substrate 2 is caused to face the surface on which the projections 18 are formed in the package 4, with the substrate surface 28 of the optical element mounting substrate 2 being directed downwardly (in FIG. 7A), the optical element mounting substrate 2 is caused to overlap on the base portion 31 of the package 4, and the projections 18 are inserted and fitted into the V-shaped grooves 9.

FIG. 8 is a cross-sectional view showing an fitted condition of the projections 18 into the V-shaped grooves 9. As shown in FIG. 8, the cross section of the projections 18 is formed into an arcuate shape at their ends, and the ends contact the groove surfaces of the V-shaped grooves 9. Then, thus, the projections 18 are inserted and fitted into the V-shaped grooves 9 so that the package 4 and the optical element mounting substrate 2 are positioned with each other and the array type optical element 1 and the input/output optical fibers 7 are centered and optically coupled to each other.

Under the condition in which the optical element mounting substrate 2 and the package 4 are overlapped with each other as described above, the region (indicated by reference character A in FIG. 7A) between an inner wall surface 32a of the side wall 32 of the package 4 and the optical element 1 is sealed with resin. Thus, the input/output optical fibers 7 are bonded and fixed to the package 4, at the same time, the optical element 1 of the optical element mounting substrate 2 as a whole is covered by the resin to be sealed. Furthermore, the optical element mounting substrate 2 is fixed to the package 4.

The package 4 in which the optical element mounting substrate 2 is provided is mounted on a lead frame package 11 with the optical element mounting substrate 2 being directed downwardly as indicated by the arrow C in FIG. 7A, and fixed by adhesives 30.

The optical module 100 shown in FIGS. 7A and 7B is constructed as described above. This optical module 100 is constructed so as to be electrically connectable to a circuit of a mounting substrate (not shown) through a plurality of lead terminals 17 formed in the lead frame package 11.

Incidentally, reference numeral 20 in FIGS. 7A and 7B indicates an opening portion, which is a hole for wire bonding (lines made of gold are arranged from the optical element mounting substrate 2 to the lead frame package 11) and injecting the adhesives 30.

As described above, with the optical module 100, only the projections 18 of the package 4 are inserted and fitted in the V-shaped grooves 9 of the optical element mounting substrate 2 so that the array type optical element I and the input/output optical fibers 7 are centered and optically coupled to each other. Thus, it is possible to provide the optical module that may optically and directly coupling the array type optical element 1 and the input/output optical fibers 7 with each other without any lens without using an expensive device.

However, although the resin made package 4 is molded by transfer molding, injection molding of the resin or the like, there is a problem in that it is technically difficult to form the projections 18 into a desired shape, for example, an arcuate shape having a diameter of about 125 μm.

Namely, in order to form the package 4, as shown in FIG. 9, the resin forming the package 4 is caused to flow into a mold 33 having a groove 33a for forming the projection 18 and cured. At this time, in order to form the projection 18 to have an exact size and an exact shape, it is necessary to transfer the groove 33a of the mold 33 exactly with the precision of ±1 μm. In order to attain this, a high processing technique is required. Also, in view of the fact that it is difficult to exactly evaluate the dimension of the machined mold, it is difficult to enhance the dimensional precision of the mold 33 by feeding back the information of the dimensional error of the molded product.

For this reason, it is technically difficult to form the projection 18 with a high precision and exactly in accordance with the design as described above. Due to this, it is difficult to, precisely position the package 4 and the optical element mounting substrate 2 with each other. Accordingly, it is difficult to perform the precise positioning of the relative positional relationship between the optical element 1 and the input/output optical fiber 7 and to stably realize the high optical connection.

SUMMARY OF THE INVENTION

The present invention has been made in view of the above, and an object of the present invention is therefore to provide an optical module in which an optical element mounting substrate and a package may be arranged exactly with each other.

In order to attain this and other objects, according to a first aspect of the invention, there is provided an optical module having an optical element mounting substrate on which an optical element is mounted, and a package made of resin, on which the optical element mounting substrate is arranged, characterized in that a substrate side positioning groove portion is formed in a substrate surface of the optical element mounting substrate, a package side positioning groove portion is formed in the package, the package side positioning groove portion facing the substrate side positioning groove portion by arranging the optical element mounting substrate to face the package, and a positioning member is inserted between the package side positioning groove portion and the substrate positioning groove portion which face each other.

According to a second aspect of the present invention, there is provided an optical module provided with the structure according to the first aspect of the invention, and characterized in that at least one of the substrate side positioning groove portion and the package side positioning groove portion is a groove having a substantially V-shaped groove in cross section.

According to a third aspect of the invention, there is provided an optical module provided with the structure according to the first aspect of the invention, and characterized in that at least one of the substrate side positioning groove portion and the package side positioning groove portion is a groove having an arcuate groove in cross section.

According to a fourth aspect of the invention, there is provided an optical module provided with the structure according to the first aspect of the invention according to the first aspect of the invention, and characterized in that at least one of the substrate side positioning groove portion and the package side positioning groove portion has such a shape that the groove portion may engage with the positioning member with almost no gap.

According to a fifth aspect of the invention, there is provided an optical module provided with the structure according to anyone of the first to fourth aspects of the invention, and characterized in that the positioning member is a columnar member. According to a sixth aspect of the invention, there is provided an optical module provided with the structure according to anyone of the first to fifth aspects of the invention, and characterized in that a linear expansion coefficient of the positioning member is $1 \times 10^{-6}$/K or less.

According to a seventh aspect of the invention, there is provided an optical module provided with the structure according to anyone of the first to sixth aspects of the invention, and characterized in that the positioning member is an optical fiber.

According to an eighth aspect of the invention, there is provided an optical module provided with the structure according to anyone of the first to seventh aspects of the invention, and characterized in that the substrate side positioning groove portions are formed on both sides of the optical element.

According to a ninth aspect of the invention, there is provided an optical module provided with the structure according to anyone of the first to eighth aspects of the invention, and characterized in that a length of a part of the positioning member clamped between the optical element mounting substrate and the package is one third or more of the substrate side positioning groove portion.

According to a tenth aspect of the invention, there is provided an optical module provided with the structure according to anyone of the first to ninth aspects of the invention, and characterized in that the package has a base portion in which the package side positioning groove is formed, and a side wall which is formed in an upright condition at an end face of the base portion, and a hole for insertion of the positioning member is formed so as to be continuous with the package side positioning groove portion.

According to an eleventh aspect of the invention, there is provided an optical module provided with the structure according to anyone of the first to tenth aspects of the invention, and characterized in that an optical fiber to be optically coupled to the optical element is mounted on the package, and the optical fiber and the positioning member are arranged such that they are substantially in parallel with each other along their longitudinal direction and the centers thereof are substantially in the same flat plane.

According to a twelfth aspect of the invention, there is provided an optical module provided with the structure according to anyone of the first to eleventh aspects of the invention, and characterized in that the optical module further comprises an optical fiber to be optically coupled to the optical element, wherein the optical fiber is optically coupled directly to the optical element.

According to the present invention, a substrate side positioning groove portion is provided in a substrate surface of the optical element mounting substrate, a package side position groove portion is formed in the package, the optical element mounting substrate and the package are arranged with the substrate side positioning groove portion and the package side positioning groove portion facing each other, and a positioning member is inserted between the package side positioning groove portion and substrate positioning groove portion which face each other. The package side positioning portion is in the form of a groove as described above. Thus, it is possible to readily form the mold for molding the package with high precision. Accordingly, it is possible to readily form the package provided with the exact positioning groove portion, as a result of which it is possible to provide the optical module that may exactly provide the optical element mounting substrate and the package in place.

In the case where at least one of the substrate side positioning groove portion and the package side positioning groove portion is substantially in the form of a V-shape or in the case where at least one of the substrate side positioning groove portion and the package side positioning groove portion is in the arcuate form, the substantially V-shaped groove or the arcuate groove may readily be formed with high precision. It is therefore possible to enhance the positioning precision of the optical element mounting substrate and the package.

In particular, in the case where at least one of the substrate side positioning groove portion and the package side positioning groove portion has a form to fit the positioning member with almost no gap, the grooves are intimately fitted with the positioning member so that the positional displacement of the positioning member to the positioning groove portions may be avoided. It is thus possible to considerably enhance the positioning precision of the optical element mounting substrate and the package.

In the case where the positioning member is the columnar member, for example, in the case where at least one of the substrate side positioning groove portion and the package side positioning groove portion is substantially in the form of a V-shape, the columnar positioning member may be arranged in the substantially V-shaped groove without any displacement.

In the case where the linear expansion coefficient of the positioning member is at $1\times10^{-6}$/K or less, the thermal expansion or the thermal shrinkage of the positioning member due to the temperature change is very small whereby it is possible to substantially suppress the positional displacement of the package and the optical element mounting substrate caused by the temperature change.

In the case where the positioning member is the optical fiber, it is possible to form the optical fiber with very high precision, and the optical fiber is in the form of a columnar shape with its linear expansion coefficient of $1\times10^{-6}$/K or less. Thus, the optical fiber as the positioning member is inserted and fitted between the substrate side positioning groove portion and the package side positioning groove portion, and the package may be positioned to the optical element mounting substrate as designed. In addition, it is possible to suppress the positional displacement of the optical element mounting substrate and the package caused by the temperature change.

In the case where the substrate side positioning portions are formed on both sides of the optical element, it is possible to arrange the optical element to the package in the position as designed. It is thus possible to considerably enhance the optical coupling rate of, for example, the optical element and the optical fiber that is the object to be optically coupled to and mounted on the package.

In the case where the length of the part of the positioning member clamped between the optical element mounting substrate and the package is one third or more of the full length of the substrate side positioning groove portion, there is no fear that the positioning member is too short and tilted to the package. It is thus possible to align the package and the optical element mounting substrate to each other without fail.

In the case where the hole through which the positioning member passes and which is continuous with the package side positioning groove portion, the positioning member is inserted and arranged into the package side positioning groove portion through the hole of the side wall of the package, so that the positioning member may be positioned in a set position with ease.

In the case where an optical fiber to be optically coupled to the optical element is fixed to the package, and the optical fiber and the positioning member are arranged such that they are substantially in parallel with each other along their longitudinal direction and the centers thereof are substantially in the same flat plane, it is possible to position the optical element and the fiber to each other with the optimum positioning precision and to perform the very good optical coupling of the optical element and the fiber.

As described above, according to the present invention, it is possible to position the optical element and the optical fiber to each other with very high precision. It is thus possible to optically couple the optical element and the optical fiber directly to each other without any lens and without using an expensive device to thereby reduce the size of the optical module.

BRIEF DESCRIPTION OF THE DRAWINGS

These and other objects and advantages of the present invention will become more apparent and more readily appreciated from the following detailed description of the exemplary embodiments of the invention taken in conjunction with the accompanying drawings, in which.

DETAILED DESCRIPTION OF THE PREFERRED EMBODIMENTS

Figures 1A, 1B, 1C:
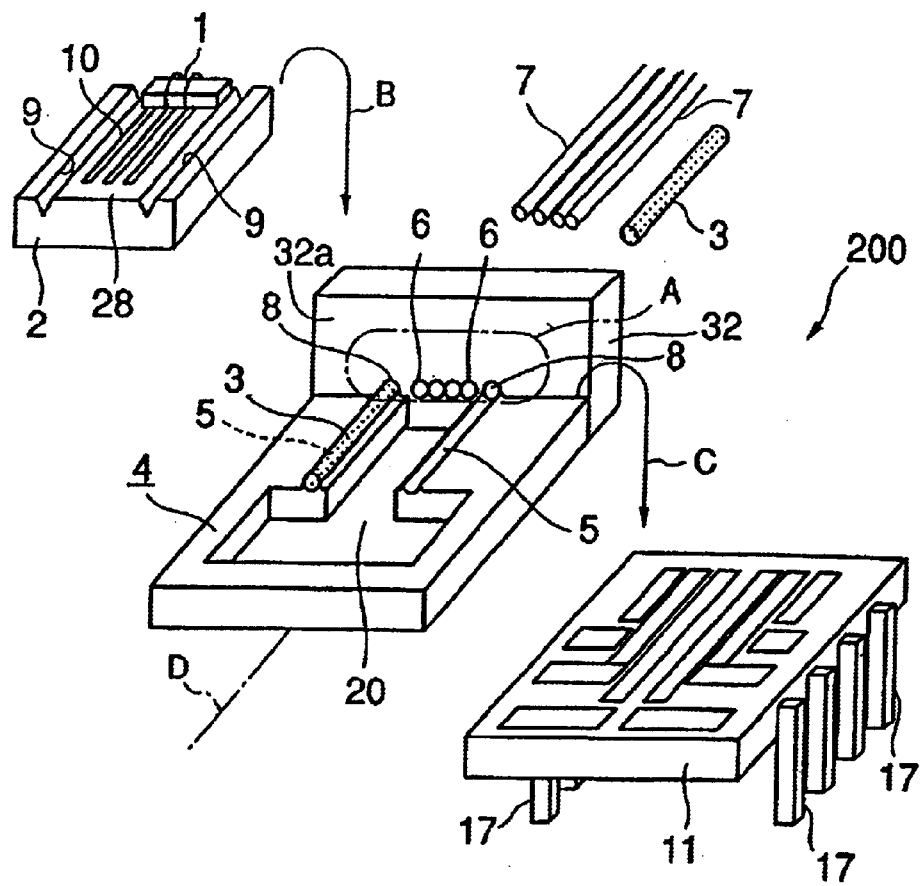
FIG. 1A is an exploded view of a primary part of an optical module according to an embodiment of the present invention.
FIG. 1B is a perspective view of an example of an outer appearance of the optical module shown in FIG. 1A.
FIG. 1C is a side elevational view of an example of a state in which another optical component is connected to the optical module shown in FIG. 1A.
Figure 2A:
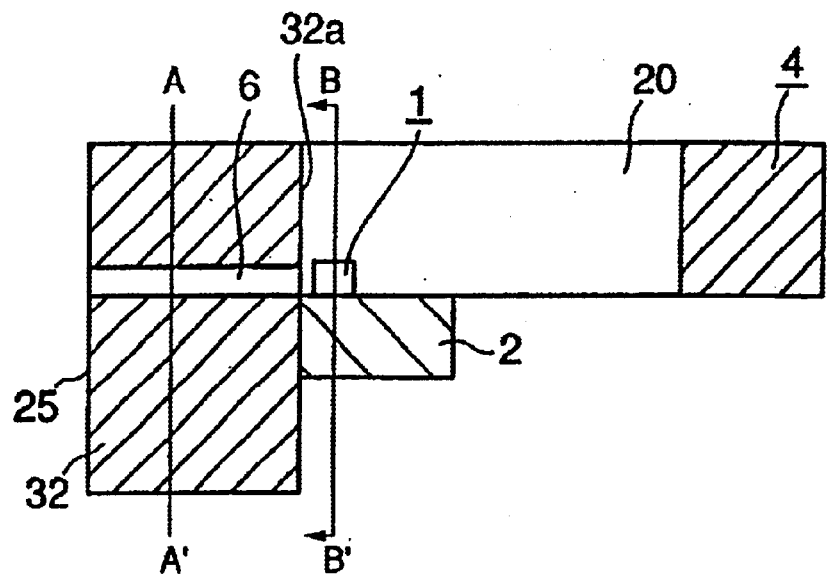
FIG. 2A is a cross-sectional view taken along an extension line of a straight line D shown in FIG. 1A, showing a state in which an optical element mounting substrate is arranged on and fixed to optical module.
Figure 2B:
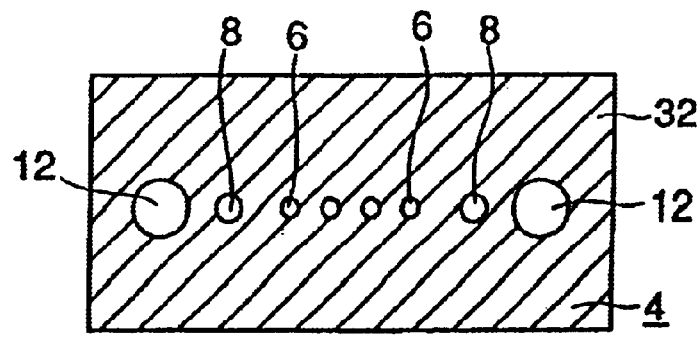
FIG. 2B is a cross-sectional view A' of FIG. 2A.
Figure 2C:
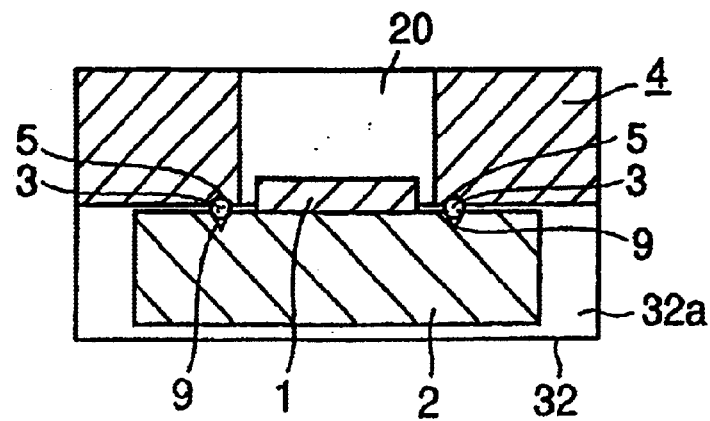
FIG. 2C is a cross-sectional view B' of FIG. 2A.

An embodiment of the present invention will now be described in detail with reference to the accompanying drawings. Incidentally, the same reference numerals are used to indicate the same members and like components as those shown in FIGS. 7A, 7B, 8 and 9. Therefore, the explanation therefor will be omitted. FIG. 1A is an exploded view of an optical module according to an embodiment of the present invention. FIG. 1B is a perspective view of an example of an outer appearance of the optical module 200 shown in FIG. 1A. FIG. 1C is a side elevational view of an example of a state in which another optical component 400 is connected to the optical module 200 shown in FIG. 1A. Further, cross-sectional view taken along an extension line of a straight line D shown in FIG. 1A, showing a state in which an optical element mounting substrate 2 is arranged on and fixed to a package 4 of the optical module 200. FIG. 2B is a cross-sectional view taken along the line A-A' of FIG. 2A and FIG. 2C is a cross-sectional view taken along of FIG. 2A, showing this state, respectively.

The optical module 200 shown in these drawings according to the embodiment is composed of the optical element mounting substrate 2, the package 4 and a lead frame package 11. The structure of each of the optical element mounting substrate 2 and the lead frame package 11 is the same as that of the conventional case. This embodiment is different from the conventional case in that, as shown in FIGS. 1A and 2C, positioning grooves are provided in the optical element mounting substrate 2 and the package 4, respectively, and positioning members 3 for positional alignment are provided between positioning groove portions 5 of the package 4 and positioning groove portions 9 of the optical element mounting substrate 2.

Figure 3:
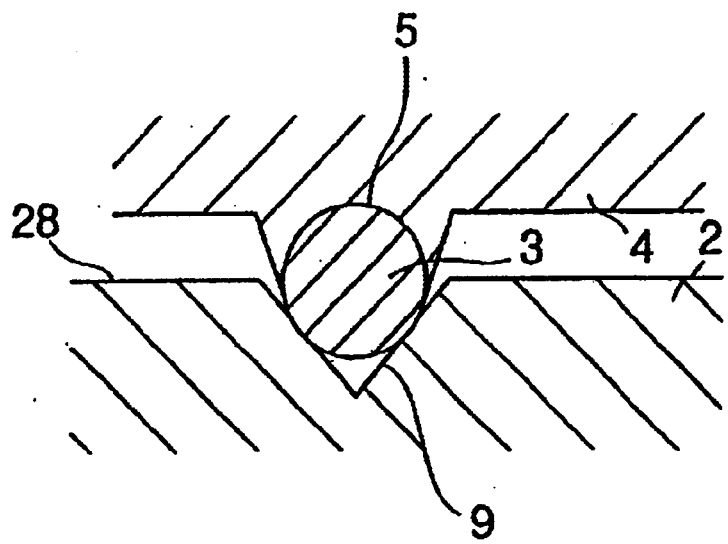
FIG. 3 is a cross-sectional view showing an example of positioning structure of the package and the optical element mounting substrate shown in FIG. 1A.

Namely, in this embodiment, each of the grooves 5 having an arcuate cross-section as shown in FIG. 3 (arcuate groove) is formed as the package side positioning groove portion at a position corresponding to a V-shaped groove 9 of the optical element mounting substrate 2 in the package 4. As indicated by the arrow B in FIG. 1A, a mounting surface (substrate surface) 28 of the optical element 1 is caused to face the surface of the package 4 where the arcuate groove 5 is formed with the substrate surface 28 being directed downwardly in FIG. 1A, and the optical element 1 is overlapped on the package 4. As shown in FIG. 2C, the V-shaped groove 9 of the optical element mounting substrate 2 and the arcuate groove 5 of the package 4 are arranged to face each other. The positioning optical fiber 3 (optical fiber) that is the common positioning member is inserted between the V-shaped groove 9 and arcuate groove 5 which face each other.

FIG. 3 shows, in cross section, an engagement state of the V-shaped groove 9 and arcuate groove 5 with the positioning optical fiber 3. As shown in FIG. 3, in this embodiment, the arcuate groove 5 is formed to have substantially the same diameter as the outer diameter of the positioning optical fiber 3. For this reason, the positioning optical fiber 3 is contacted at two positions with the groove surface of the V-shaped groove 9 and engaged with the arcuate groove 5 with almost no gap. The package 4 and the optical element mounting substrate 2 are aligned with each other by the positioning optical fiber 3 and the arcuate groove 5 and V-shaped groove 9. Thus, the array type optical element 1 and the input/output optical fibers 7 are optically coupled with each other in a centered condition.

For instance, a single mode fiber or the like that is generally used is used as the positioning optical fiber 3. This single mode fiber is very thin to have a diameter of, for example, about 125/$\mu$m. For this reason, this single mode fiber is used as the positioning optical fiber 3 to thereby make it possible to miniaturize the optical module 200. In addition, since the single mode fiber has a high molding precision although it is thin as described above, it is possible to considerably enhance the positioning precision. Furthermore, since the single mode fiber is generally made of quartz, the linear expansion coefficient is very small at $4\times10^{-7}$/K or less. It is thus possible to prevent the positional displacement of the package 4 and the optical element mounting substrate 2 due to the temperature change. Moreover, since the positioning optical fiber 3 is formed into a columnar shape, it is easy to perform the positioning by the V-shaped grooves 9.

Figure 4:
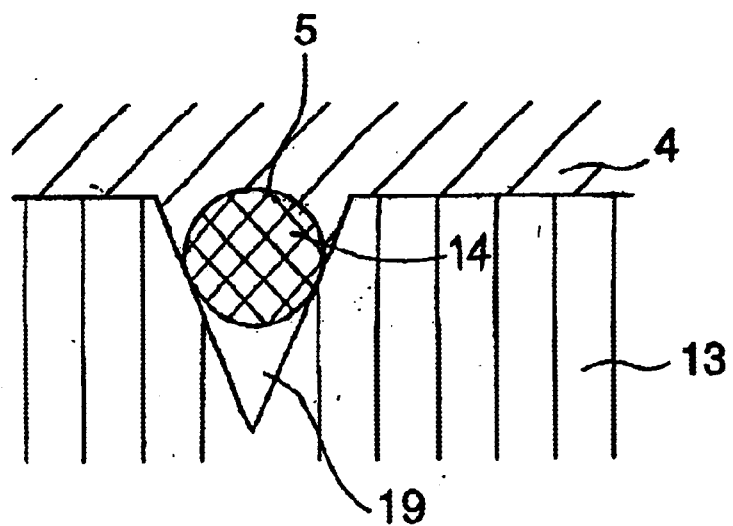
FIG. 4 is a view illustrating an example of a molding process of an arcuate groove of the package constituting the optical module according to the present invention.

The arcuate groove 5 may be formed as follows because the positioning optical fiber 3 has such a shape that it may engage with the groove with almost no gap as described above. For instance, as shown in FIG. 4, a V-shaped groove 19 is formed in a mold 13 for molding the package 4, and a core pin 14 is arranged in this V-shaped groove 19. Then, upon the molding of the package 4, under this condition, resin is caused to flow into the mold 13 and cured. Thus, it is possible to form the arcuate groove 5 along the surface shape of the core pin 14. Since both the V-shaped groove 19 of the mold 13 and the core pin 14 have a very high dimensional precision, it is possible to mold the arcuate groove 5 with very high precision as well.

In this embodiment, as described above, the arcuate groove 5 may be molded with very high dimensional precision, and as shown in FIG. 3, the positioning optical fiber 3 may be engaged with the arcuate groove 5 with almost no gap. Thus, it is possible to position the positioning optical fiber 3 with high precision. Further, although adhesives 30 are introduced in the gap between the optical element mounting substrate 2 and the package 4, the positioning optical fiber 3 is substantially in contact with the arcuate groove 5 as described above to thereby make it possible to reduce the amount of the adhesives 30 to be introduced between the two components. Thus, it is possible to prevent the positional displacement of the positioning optical fiber 3 based upon the thermal expansion and the thermal shrinkage of the adhesives due to the environmental temperature change, i.e., the positional displacement between the optical element 1 and the input/output optical fibers 7. In addition, since the positioning groove portion of the optical element mounting substrate 2 is formed into the V-shaped groove 9 so that the adhesives are introduced into the gap between the bottom of the V-shaped groove 9 and the positioning optical fiber 3, the adhesion strength of the positioning optical fiber 3 to the optical element mounting substrate 2 is sufficient. Furthermore, in this embodiment, a plurality (two in this case) of combinations between the V-shaped grooves 9 and the arcuate grooves 5 are provided on both sides of the optical element 1. It is therefore possible to prevent the positional displacement between the optical element 1 and the input/output optical fibers 7 due to the thermal expansion and the thermal shrinkage of the respective components caused by the environmental temperature change.

As shown in FIG. 2B, positioning optical fiber insertion holes 8 through which the positioning optical fibers 3 pass are formed on both sides of the arrangement of input/output optical fiber insertion holes 6 in the side wall 32 of the package 4. The formation direction of these positioning optical fiber element insertion holes 8 is substantially in parallel with the formation direction of the input/output optical fiber insertion holes 6. In addition, the centers of these positioning optical fiber insertion holes 8 are arranged substantially in the same level with the centers of the input/output optical fiber insertion holes 6. Moreover, the positioning optical fiber insertion holes 8 are formed to be continuous with the arcuate grooves 5.

Since the positioning optical fiber insertion holes 8 are thus formed, the longitudinal directions of the positioning optical fibers 3 to be inserted into the positioning optical fiber insertion holes 8 and the input/output optical fibers 7 to be inserted into the input/output optical fiber insertion holes 6 (i.e., the optical fibers to be optically coupled with the optical element 1) are substantially in parallel with each other, and the centers thereof are substantially in the same level. In other words, the arrangement is attained such that the positioning precision of the input/output optical fibers 7 is at optimum by the positioning optical fibers 3.

It is also preferable that a length of the part of the positioning optical fibers 3 clamped by the optical element mounting substrate 2 and the package 4 be one third or more of the full length of the V-shaped grooves 9 of the optical element mounting substrate 2. In view of this, in this embodiment, the positioning optical fibers 3 are somewhat longer than the full length of the arcuate grooves 5 of the package 4.

Further, in this embodiment, pin fitting recess portions 12 opened on the insertion side 25 of the input/output optical fiber as shown in FIG. 1C are formed in positions outside the positioning optical fiber insertion holes 8. Positioning pins 402 are inserted in the pin fitting recess portions 12 as shown in FIG. 1C. When the optical module 200 is connected to another optical component such as an MT (Mechanical Transferable) connector 400 provided with an optical fiber 401 for input/output of a beam with respect to the input/output optical fibers 7 of the optical module 200, the positioning operation with the other optical component may readily be performed by these pin fitting recess portions 12 and the positioning pins 402.

The optical module 200 according to this embodiment is constructed as described above, An example of the manufacturing process of this optical module 200 will briefly be described. First of all, as shown in FIGS. 1A, the pattern of electric signal wirings 10 is formed on the substrate surface 28 of the optical element mounting substrate 2, and at the same time, the V-shaped grooves 9 are formed on both sides of the pattern of the electric signal wirings 10. The optical element 1 is loaded on the substrate surface 28 of the optical element mounting substrate 2.

On the other hand, the package 4 is molded of resin. The arcuate grooves 5, the input/output optical fiber insertion holes 6, the positioning optical fiber insertion holes 8, the pin fitting recess portions 12 and the opening portion 20 are formed in this package 4. Then, the input/output optical fibers 7 are inserted into the above-described input/output optical fiber insertion holes 6 and bonded and fixed thereto.

Subsequently, the substrate surface 28 of the thus manufactured optical element mounting substrate 2 is caused to face the arcuate groove 5 formation surface of the package 4, and the optical element mounting substrate 2 is overlapped on the package 4 with the V-shaped grooves 9 being aligned with the arcuate grooves 5. At this time, the positioning optical fibers 3 are inserted through the positioning optical fiber insertion holes 8 between the V-shaped grooves 9 and the arcuate grooves 5. Thus, the optical element mounting substrate 2 and the package 4 are positioned in place. Therefore, the array type optical element 1 and the input/output optical fibers 7 are centered and optically coupled directly with each other without using any lens.

As described above, in this embodiment, the positioning optical fiber insertion holes 8 are thus provided. For this reason, the positioning optical fibers 3 are arranged on the arcuate groove portions 5 through the positioning optical fiber insertion holes 8 as described above so that the arrangement of the positioning optical fibers 3 to the arcuate grooves 5 may readily be performed.

Subsequently, under the condition that the optical element mounting substrate 2 is overlapped on the package 4 as described above, the region (indicated by A in FIG. 1A) between the input/output optical fibers 7 fixture portion of the side wall 32 of the package 4 and the optical element 1 is sealed with resin. Thus, the fixture of the input/output optical fibers 7 to the package 4 is performed and at the same time, the optical element 1 of the optical element mounting substrate 2 as a whole is covered with the resin to be sealed. Furthermore, the fixture of the optical element mounting substrate 2 to the package 4 is performed.

Thereafter, the package 4 is loaded on the lead frame package 11 that has been produced separately with the optical element mounting substrate 2 side being directed downwardly as indicated in the arrow C in FIG. 1A. The wire bonding is effected to the respective lead patterns on the optical element mounting substrate 2 and the lead frame package 11.

Thereafter, the adhesives 30 are caused to flow from the opening portion 20 of the package 4 and to be cured. Thus, the package 4 and the lead frame package 11 are fixed to each other to complete the optical module 200.

As shown in FIG. 1C, such an optical module 200 is mounted on a mounting substrate 300 and may be electrically connected to the circuit of the mounting substrate 300 through a plurality of lead terminals 17 formed on the lead frame package 11.

According to this embodiment, as described above, the arcuate grooves 5 for positioning are formed in the package 4. In order to form the arcuate grooves 5, as described above, the V-shaped grooves 19 are formed in the mold 13 for molding the package, and the resin is caused to flow into the mold 13 under the condition that the core pins 14 are engaged with the V-shaped grooves 19 and is cured. The arcuate grooves 5 are thus formed. It is possible to form the V-shaped grooves 19 to the mold 13 with very high precision and it is also possible to form the core pins 14 with high precision, as a result of which the package 4 having the arcuate grooves 5 with high dimensional precision may be formed.

Further, in this embodiment, the arcuate grooves 5 thus formed and the V-shaped grooves 9 on the side of the optical element mounting substrate 2 are caused to face each other, and the positioning optical fibers 3 are fitted between the grooves 5 and 9 which face each other. Thus, the optical element mounting substrate 2 and the package 4 are positioned to each other. Since the positioning fibers 3 have been formed with high precision in size and shape conventionally, the positioning operation of the optical element mounting substrate 2 and the package 4 by using the positioning optical fibers 3 may readily be performed with high precision. For this reason, it is possible to perform the optical coupling between the optical element 1 provided on the optical element mounting substrate 2 and the optical fibers 7 to be inserted into the package 4 with high precision and in a stable manner.

Figure 5A:
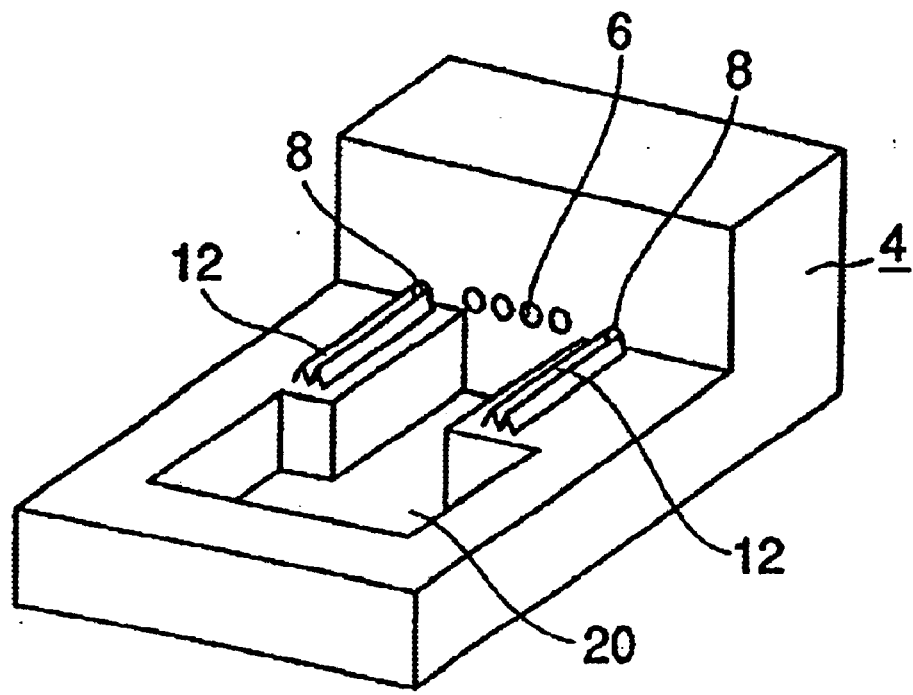
FIG. 5A is a perspective view of a package used in another embodiment of an optical module according to the present invention.
Figure 5B:
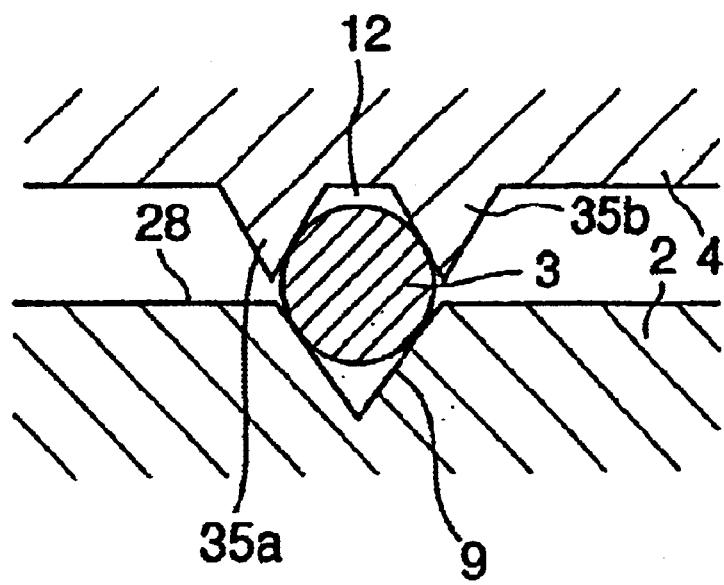
FIG. 5B is a cross-sectional view showing an example of a positioning structure of the package and an optical element mounting substrate in the optical module in the embodiment.

Incidentally, the present invention is not limited to the above-described embodiment and may take various forms. For example, although the positioning groove portions on the side of the package are the arcuate grooves 5 in the foregoing embodiment, the shape of the grooves is not limited thereto. For example, as shown in FIGS. 5A and 5B, the package side positioning groove portions may be formed into an inverted W-shape 12. This inverted W-shaped groove 12 having an inverted W-shape in cross section is formed by the groove defined between two projections 35a and 35b. In this case, under the condition shown in FIG. 5B, the inverted W-shaped groove 12 and the V-groove 9 on the side of the optical element mounting substrate 2 are caused to face each other. The common positioning optical fiber 3 is inserted between the inverted W-shaped groove 12 and V-shaped groove 9 which face each other. Thus, the package 4 and the optical element mounting substrate 2 are positioned to each other.

Figure 6:
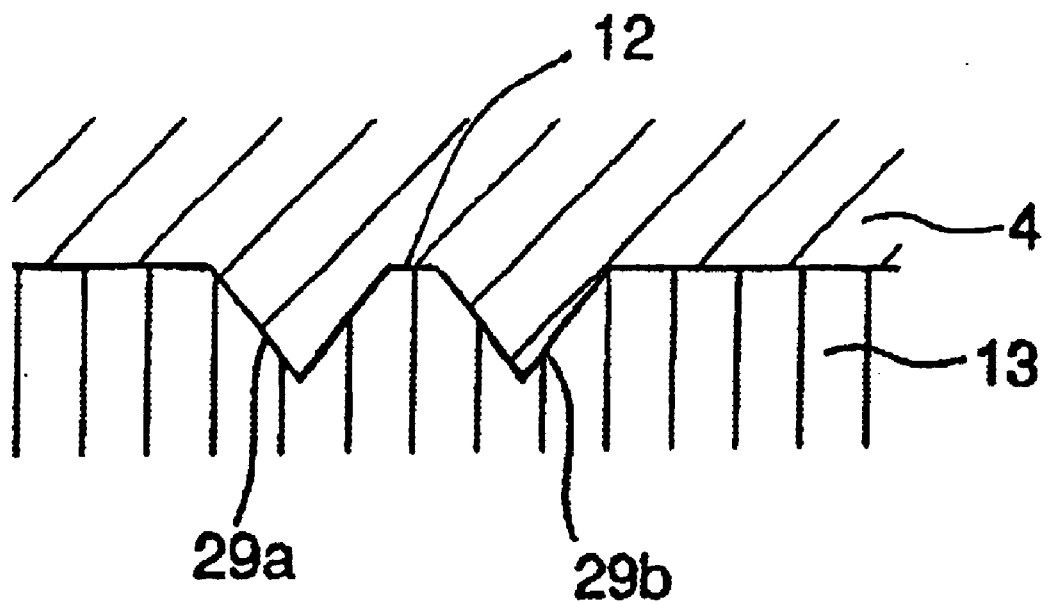
FIG. 6 is a view illustrating an example of a molding process of an inverted W-shaped groove of the package shown in FIG. 5A.
Figure 7A:
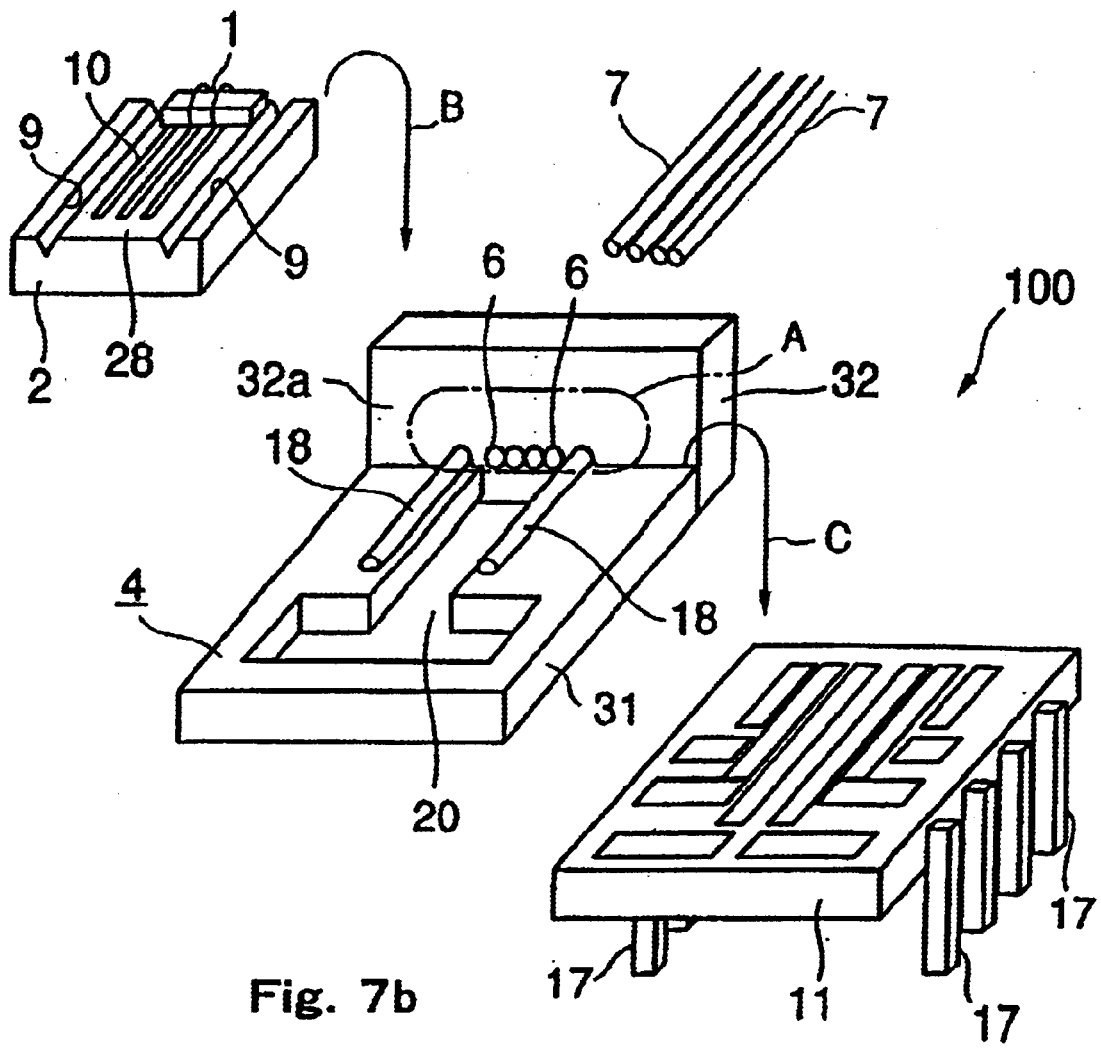
FIG. 7A is an exploded view of a primary part showing an example of a conventional optical module.
Figure 7B:
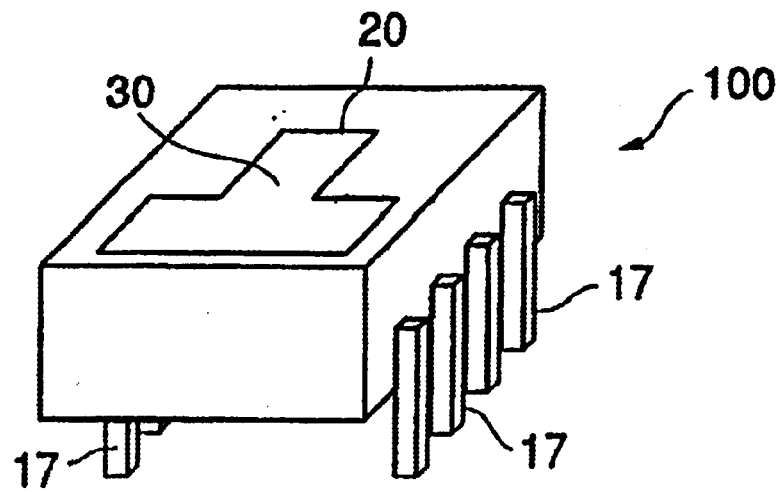
FIG. 7B is a perspective view showing an example of an outer appearance of the optical module shown in FIG. 7A.
Figure 8:
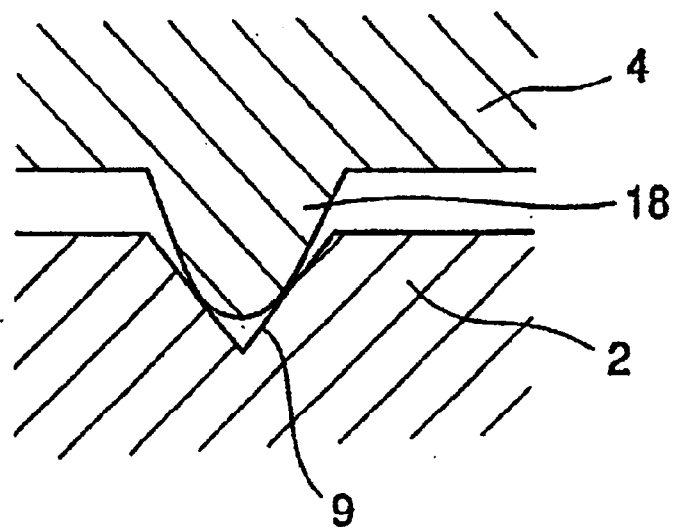
FIG. 8 is a view illustrating an example of a positioning structure of a package and an optical element mounting substrate in the conventional optical module.
Figure 9:
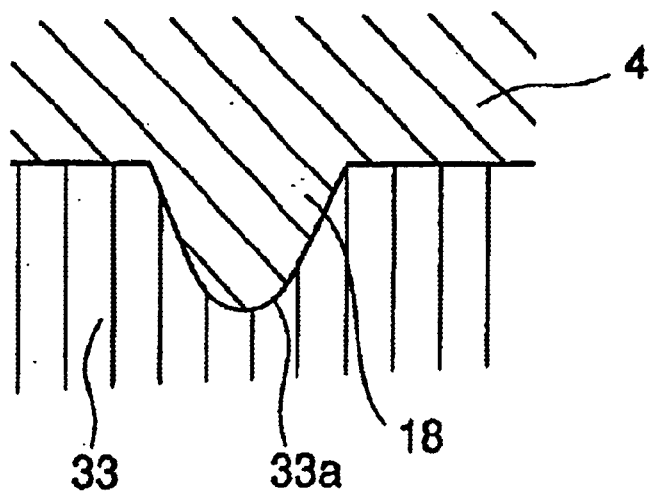
FIG. 9 is a view illustrating an example of a molding process of projections of the conventional package.

Further, when the package 4 having the inverted W-shaped groove 12 is to be formed, as shown in FIG. 6, V-shaped grooves 29a and 29b for forming the inverted W-shaped groove 12 are formed closely in the mold 13 for molding the package. It is possible to readily form the V-shaped grooves 29a and 29b in the mold 13 with high precision as described above. For this reason, it is possible to form the inverted W-shaped groove 12 in the package 4 with high precision. Thus, even if the optical module 200 is constructed by using the package 4 in which the package side positioning groove portions are formed into the inverted W-shaped groove 12 as described above, it is possible to provide the same effect as in the above-described embodiment.

Further, although the common positioning member to be inserted into the package side positioning groove portion and the substrate side positioning groove portion, which face each other, is used as the positioning optical fiber 3 in the foregoing embodiment, it is not always necessary to use the positioning optical fiber 3 as this positioning member. For instance, it is possible to use a molding pin made of ceramics or metal having a linear expansion coefficient of, for example, $1\times10^{-6}$/K or less.

Moreover, in the foregoing embodiment, the V-shaped grooves 9 are formed as the substrate side positioning groove portions in the optical element mounting substrate 2. However, the shape of the grooves is not limited thereto and may be selected as desired.

Furthermore, although the arcuate grooves 5 are formed as the package side positioning groove portions in the package 4 in this embodiment, and the V-shaped grooves 9 are formed as the substrate side positioning groove portions in the optical element mounting substrate 2, each shape, size, number and position of formation of the package side positioning groove portions and the substrate side positioning groove portions are not limited to those of the above-described embodiment and may be selected suitably to position and fix the positioning members.

What is claimed is:

1. An optical module comprising:
   an optical element;
   an optical element mounting substrate on which the optical element is mounted, the optical element mounting substrate having a substrate side positioning groove formed in a substrate surface;
   an input/output optical fiber optically coupled to the optical element;
   a package made of resin and on which said optical element mounting substrate is arranged, the package having a base on which a package side positioning groove is formed, the package side positioning groove facing the substrate side positioning groove by arranging said optical element mounting substrate to face said package, the package further having a side wall which is formed in an upright condition at an end face of said base, the side wall having a first hole formed so as to be continuous with the package side positioning groove, the side wall further having a second hole formed to align with the optical element and to accept the input/output optical fiber; and
   a positioning member located in the first hole and between the package side positioning groove and the substrate side positioning groove.

2. The optical module of claim 1, wherein said optical element is an array type optical element, and said input/output optical fiber comprises a plurality of input/output optical fibers.

3. The optical module of claim 2, wherein at least one of the substrate side positioning groove and the package side positioning groove comprises a groove having a substantially arcuate shape in cross section corresponding substantially to a portion of the positioning member positioned therein.

4. An optical module according to claim 2, wherein at least one of the substrate side positioning groove and the package side positioning groove is a groove having a substantially V-shape in cross section.

5. An optical module according to claim 2, wherein at least one of the substrate side positioning groove and the package side positioning groove has a shape so that said at least one groove engages with said positioning member so that there is substantially no gap therebetween.

6. An optical module according to claim 2, wherein said positioning member is a columnar member.

7. An optical module according to claim 2, wherein a linear expansion coefficient of said positioning member is $1\times10^{-6}$/K or less.

8. An optical module according to claim 2, wherein said input/output optical fibers are mounted on said package, and said input/output optical fibers and said positioning member are arranged such that they are substantially in parallel with each other along their longitudinal direction and the centers thereof are substantially in the same flat plane.

9. An optical module according to claim 2, wherein said positioning member is an optical fiber.

10. An optical module according to claim 4, wherein said positioning member is an optical fiber.

11. An optical module according to claim 8, wherein said positioning member is an optical fiber.

12. An optical module according to claim 3, wherein the substrate side positioning groove and the package side positioning groove are formed on each side of said optical element.

13. An optical module according to claim 10, wherein the substrate side positioning groove and the package side positioning groove are formed on each side of said optical element.

14. An optical module according to claim 6, wherein the substrate side positioning groove and the package side positioning groove are formed on each side of said optical element.

15. An optical module according to claim 11, wherein the substrate side positioning groove and the package side positioning groove are formed on each side of said optical element.

16. An optical module according to claim 12, wherein a length of a part of said positioning member clamped between said optical element mounting substrate and said package is one third or more of the full length of the substrate side positioning groove.

17. An optical module according to claim 13, wherein a length of a part of said positioning member clamped between said optical element mounting substrate and said package is one third or more of the full length of the substrate side positioning groove.

18. An optical module according to claim 14, wherein a length of a part of said positioning member clamped between said optical element mounting substrate and said package is one third or more of the full length of the substrate side positioning groove.

19. An optical module according to claim 15, wherein a length of a part of said positioning member clamped between said optical element mounting substrate and said package is one third or more of the full length of the substrate side positioning groove.

20. An optical module according to claim 2, wherein said input/output optical fibers are optically coupled directly to said optical element.

* * * * *